(12) United States Patent
Xu et al.

(10) Patent No.: US 11,002,198 B2
(45) Date of Patent: May 11, 2021

(54) VEHICLE GENERATOR CONTROL METHOD AND SYSTEM THEREOF

(71) Applicant: GUANGXI YUCHAI MACHINERY CO., LTD., Guangxi (CN)

(72) Inventors: Xingjun Xu, Guangxi (CN); Xinbao Zhu, Guangxi (CN); Wanni Zhu, Guangxi (CN); Liqiang An, Guangxi (CN); Junhong Chen, Guangxi (CN); Liyong Su, Guangxi (CN); Wei Cai, Guangxi (CN); Jianlong Wang, Guangxi (CN)

(73) Assignee: GUANGXI YUCHAI MACHINERY CO., LTD., Guangxi (CN)

( * ) Notice: Subject to any disclaimer, the term of this patent is extended or adjusted under 35 U.S.C. 154(b) by 0 days.

(21) Appl. No.: 16/467,986

(22) PCT Filed: Oct. 23, 2017

(86) PCT No.: PCT/CN2017/106276
§ 371 (c)(1),
(2) Date: Jun. 10, 2019

(87) PCT Pub. No.: WO2019/029003
PCT Pub. Date: Feb. 14, 2019

(65) Prior Publication Data
US 2020/0072138 A1 Mar. 5, 2020

(30) Foreign Application Priority Data

Aug. 11, 2017 (CN) .......................... 201710683856.7

(51) Int. Cl.
*F02D 29/06* (2006.01)
*F02D 41/04* (2006.01)
(Continued)

(52) U.S. Cl.
CPC ........... *F02D 29/06* (2013.01); *F02D 41/042* (2013.01); *F02N 11/04* (2013.01); *B60R 16/023* (2013.01)

(58) Field of Classification Search
CPC ...... F02D 29/06; F02D 41/042; F02D 41/064; F02N 11/04; F02N 2200/0809;
(Continued)

(56) References Cited

FOREIGN PATENT DOCUMENTS

| CN | 201953539 | | 8/2011 |
|---|---|---|---|
| CN | 201953539 U | * | 8/2011 |

(Continued)

OTHER PUBLICATIONS

"International Search Report (Form PCT/ISA/210) of PCT/CN2017/106276," dated May 10, 2018, with English translation thereof, pp. 1-4.

*Primary Examiner* — Tulsidas C Patel
*Assistant Examiner* — Joseph Ortega
(74) *Attorney, Agent, or Firm* — JCIP Global Inc.

(57) ABSTRACT

Provided is a vehicle generator control method. An engine ECU controls the generator according to an operating condition of the engine, and the control process is as follows: when the engine ECU determines that the engine is in a starting condition, the engine ECU controls a generator separately excited loop to be disconnected, so that the generator does not generate electricity; and when the engine ECU determines that the engine enters an idling condition, the engine ECU controls the generator separately excited loop to be closed, so that the generator is started to generate electricity, and after the generator is started to generate electricity, the generator carries out normal electricity generation until the engine stops operating. Through the vehicle generator control method, the starting load of the engine can be effectively reduced, and cold starting capacity is (Continued)

improved. Also provided is a vehicle generator control system.

19 Claims, 5 Drawing Sheets

(51) Int. Cl.
*F02N 11/04* (2006.01)
*B60R 16/023* (2006.01)

(58) Field of Classification Search
CPC .. F02N 19/001; F02N 11/0862; F02N 11/087; F02N 11/084; B60R 16/023
See application file for complete search history.

(56) References Cited

FOREIGN PATENT DOCUMENTS

| | | |
|---|---|---|
| CN | 103023410 | 4/2013 |
| CN | 103615345 | 3/2014 |
| CN | 205044671 | 2/2016 |
| DE | 102005035052 | 2/2007 |
| JP | 2006296016 | 10/2006 |

\* cited by examiner

When an engine ECU determines that an engine is in a starting condition, the engine ECU controls a generator separately excited loop to be disconnected, so that a generator does not generate electricity When the engine ECU determines that the engine enters an idling condition, the engine ECU controls the generator separately excited loop to be closed, so that the generator is started to generate electricity, and after the generator is started to generate electricity, the generator carries out normal electricity generation until the engine stops operating

VEHICLE GENERATOR CONTROL METHOD AND SYSTEM THEREOF

CROSS-REFERENCE TO RELATED APPLICATION

This application is a 371 of international application of PCT application serial no. PCT/CN2017/106276, filed on Oct. 23, 2017, which claims the priority benefit of China Application No. 201710683856.7 filed on Aug. 11, 2017. The entirety of each of the above-mentioned patent applications is hereby incorporated by reference herein and made a part of this specification.

BACKGROUND OF THE INVENTION

1. Field of the Invention

The present invention relates to the field of generator control technologies, in particular, to a vehicle generator control method and a vehicle generator control system.

2. Description of Related Art

For a separately excited generator, the generator needs to undergo two processes of separate excitation and self-excitation to generate electricity: in an engine starting condition, that is, a process in which a motor is turned to idle, a generator excitation coil needs to generate an excitation magnetic field by connecting an external current. The process that requires external electric energy to generate or maintain the excitation magnetic field is separate excitation. When a generator speed reaches a certain value, the generator starts to output electric energy while self-supplying an excitation current to maintain the excitation magnetic field, that is, self-excitation. In the existing vehicle control, when an ignition key is powered on, the generator excitation coil starts to charge. Once started, the generator often starts to generate electricity in the starting process of a starting motor. However, at this time, the starting motor is still engaged. The power consumption is large, the state of charge (SOC) of a storage battery is low, the generator will generate a large current instantaneously to meet the load demand, and the current becomes a large load under a starting condition. The instantaneous large current load generated by the starting condition of the generator will increase the starting load of the generator and affect the cold starting capacity of a vehicle, resulting in the vehicle being unable to start or difficult to start in cold weather. This phenomenon is particularly noticeable in medium and light vehicles.

SUMMARY OF THE INVENTION

The present invention is directed to a vehicle generator control method, which can effectively reduce the starting load of an engine and improve cold starting capacity.

The present invention is also directed to a vehicle generator control system using the method.

To achieve the first objective, a vehicle generator control method is provided. An engine ECU (engine control unit) controls the generator according to an operating condition of the engine. A control process is as follows:

When the engine ECU determines that the engine is in a starting condition, the engine ECU controls a generator separately excited loop to be disconnected, so that the generator does not generate electricity.

When the engine ECU determines that the engine enters an idling condition, the engine ECU controls the generator separately excited loop to be closed, so that the generator is started to generate electricity, and after the generator is started to generate electricity, the generator carries out normal electricity generation until the engine stops operating.

Preferably, the engine ECU determines the operating condition of the engine via an engine speed signal and an engine starting signal, when the engine ECU receives the engine starting signal and the received engine speed signal displays that an engine speed is lower than an idling speed, the engine is in a starting condition, and when the engine speed signal received by the engine ECU displays that the engine speed is equal to the idling speed, the engine is in an idling condition.

Preferably, the generator separately excited loop is provided with a generator control relay, and the engine ECU carries out ON/OFF control on the generator separately excited loop via the generator control relay to control an operation of the generator.

Preferably, the generator control relay is arranged on a controllable circuit connecting in series from an excitation positive terminal of the generator to a positive electrode of a storage battery.

To achieve the second objective, the present invention also provides a vehicle generator control system, including an engine ECU and a storage battery, and further including a generator switching unit connected using signals to the engine ECU and adapted to carry out ON/OFF control on a generator separately excited loop. One end of the generator switching unit is connected to an excitation positive terminal of a generator via a first diode for preventing a generator excitation coil from generating a reverse voltage, and the other end of the generator switching unit is connected to a positive electrode of the storage battery via an ignition switch, thereby forming a controllable circuit connecting in series from the positive electrode of the storage battery to the excitation positive terminal of the generator, where a negative electrode of the first diode is connected to the excitation positive terminal of the generator.

Preferably, the generator switching unit is provided with a generator control relay, a coil of the generator control relay is connected in parallel with the engine ECU, and a contact of the generator control relay is connected in series to the controllable circuit from the positive electrode of the storage battery to the excitation positive terminal of the generator, where one end of the contact of the generator control relay is connected to the ignition switch and the other end of the generator control relay is connected to the first diode.

Preferably, the generator switching unit is further provided with a first control relay, the generator control relay is connected via the first control relay in series to the controllable circuit from the positive electrode of the storage battery to the excitation positive terminal of the generator, and a coil of the first control relay is connected in series to the contact of the generator control relay, where an end of the generator control relay opposite to a connecting end of the contact of the generator control relay connecting to the ignition switch is connected to the coil of the first control relay, and an end of the first control relay opposite to a connecting end of the coil of the first control relay connecting to the contact of the generator control relay is connected to a ground. A contact of the first control relay is connected in series to the controllable circuit from the positive electrode of the storage battery to the excitation positive terminal of the generator, where one end of the contact of the first control relay is connected to the ignition switch and the other end of the contact of the first control relay is connected to the first diode, the contact of the generator control relay is a normally open contact, and the contact of the first control relay is a normally closed contact.

Preferably, the coil of the generator control relay is connected in parallel with the engine ECU after being connected in series to a second diode for preventing instantaneous generation of a reverse voltage due to disconnection of the coil of the generator control relay, and the engine ECU is further connected in parallel with a coil of a starter control relay.

Preferably, the contact of the generator control relay is a time-delay closed normally closed contact.

Preferably, the generator switching unit is further provided with a second control relay, the generator control relay is connected via the second control relay in series to the controllable circuit from the positive electrode of the storage battery to the excitation positive terminal of the generator, and a coil of the second control relay is connected in series to the contact of the generator control relay, where an end of the generator control relay opposite to a connecting end of the contact of the generator control relay connecting to the ignition switch is connected to the coil of the second control relay, and an end of the second control relay opposite to a connecting end of the coil of the second control relay connecting to the contact of the generator control relay is connected to a ground. A contact of the second control relay is connected in series to the controllable circuit from the positive electrode of the storage battery to the excitation positive terminal of the generator, where one end of the contact of the second control relay is connected to the ignition switch and the other end of the contact of the second control relay is connected to the first diode, the contact of the generator control relay is a time-delay disconnected normally open contact, and the contact of the second control relay is a normally closed contact.

Compared with the prior art, the present invention has the following beneficial effects:

In the present invention, the engine ECU controls the starting and operation of the generator according to the operating condition of the engine, the starting load of the engine can be effectively reduced, and cold starting capacity is improved. In a generator switching unit of the present invention, a generator control relay is provided and controlled by the engine ECU, and the starting and operation of the generator can be skillfully controlled, so that the structure is small, costs are saved, and the control precision is improved. In the present invention, a generator switching unit and a starter control relay can be interlocked by the engine ECU and a time delay relay can be used, which can effectively improve control precision and accuracy. In the present invention, the first diode is provided to effectively avoid an influence of the reverse voltage generated by the generator excitation coil on the entire circuit. In the present invention, the second diode is provided to prevent instantaneous generation of the reverse voltage due to disconnection of the coil of the generator control relay, thereby avoiding interference on the line diagnosis and control of the starter control relay caused by the influence of the reverse voltage on the engine ECU.

DESCRIPTION OF THE EMBODIMENTS

The present invention is further described below with reference to embodiments, but does not constitute any limitation to the present invention, and any finite number of modifications made within the scope of the claims of the present invention are still within the scope of the claims of the present invention.

Embodiment 1

Figure 1:
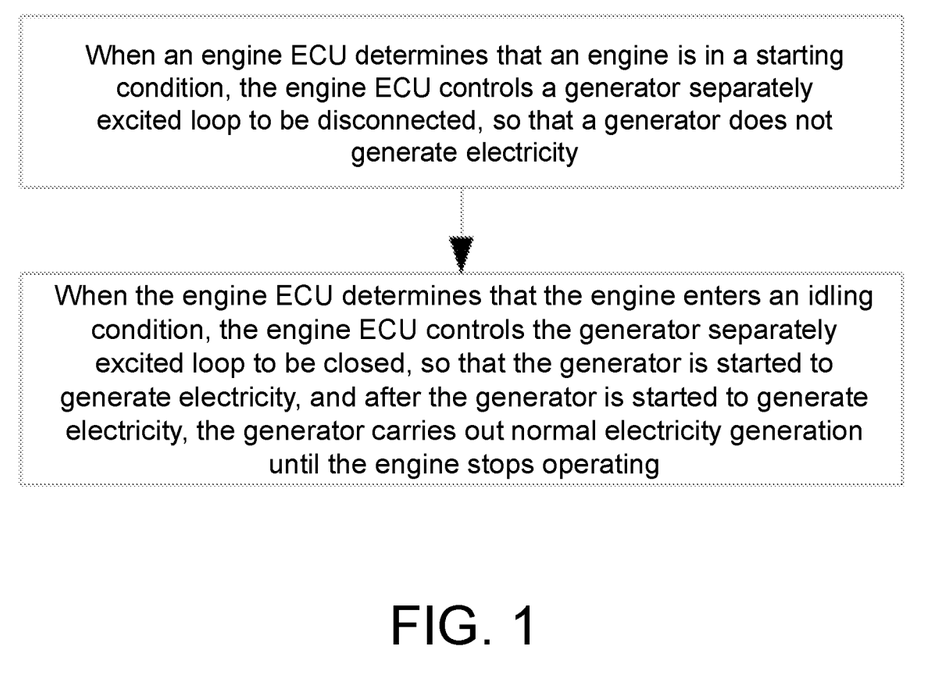
FIG. 1 is a flowchart of the present invention.
Figure 2:
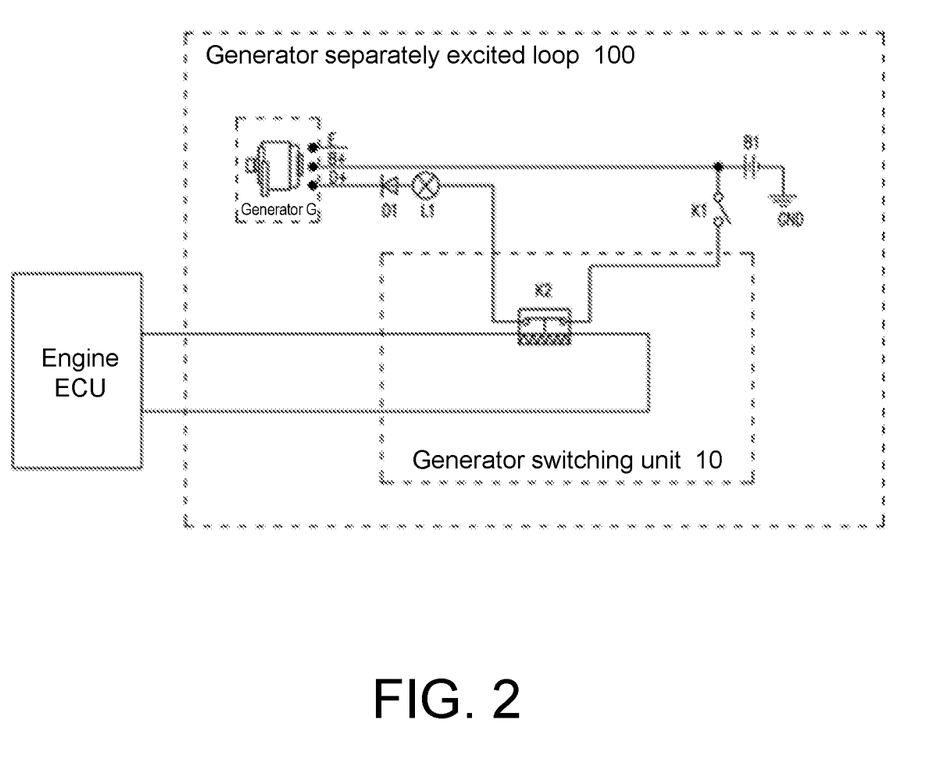
FIG. 2 is a schematic view of a circuit structure according to Embodiment 2 of the present invention.

As shown in FIG. 1 to FIG. 2, the present invention provides a vehicle generator control method. An engine ECU controls the generator according to an operating condition of the engine. A control process is as follows:

When the engine ECU determines that the engine is in a starting condition, the engine ECU controls a generator separately excited loop 100 to be disconnected, so that the generator does not generate electricity.

When the engine ECU determines that the engine enters an idling condition, the engine ECU controls the generator separately excited loop 100 to be closed, so that the generator is started to generate electricity, and after the generator is started to generate electricity, the generator carries out normal electricity generation until the engine stops operating.

The engine ECU determines the operating condition of the engine via an engine speed signal and an engine starting signal, when the engine ECU receives the engine starting signal and the received engine speed signal displays that an engine speed is lower than an idling speed, the engine is in a starting condition, and when the engine speed signal received by the engine ECU displays that the engine speed is equal to the idling speed, the engine is in an idling condition. The generator separately excited loop 100 is provided with a generator control relay K2, and the engine ECU carries out ON/OFF control on the generator separately excited loop 100 via the generator control relay K2 to control an operation of the generator. The generator control relay K2 is arranged on a controllable circuit connecting in series from an excitation positive terminal D+ of the generator to a positive electrode of a storage battery B1.

In the present embodiment, after receiving the engine speed signal and the engine starting signal, the engine ECU controls the generator control relay K2 to act, such that the generator separately excited loop 100 is disconnected to make the generator G unable to generate electricity. When receiving an engine speed signal indicating that the engine enters an idling condition, the engine ECU controls the generator control relay K2 to act, such that the generator separately excited loop 100 is closed, the storage battery B1 provides a separate excitation current for the generator G, and the generator G generates electricity. Then, when the engine normally operates, the generator G is able to generate electricity, while the generator G is able to carry out self-excitation electricity generation after normal electricity generation.

In the present embodiment, the engine speed signal and the engine starting signal are obtained by signal detection by the existing detecting device of the vehicle and are provided for the engine ECU. The engine enters an idling range of 600-800 rpm.

Embodiment 2

As shown in FIG. 2, the present invention provides a vehicle generator control system, including an engine ECU and a storage battery B1, and further including a generator switching unit 10 connected using signals to the engine ECU and adapted to carry out ON/OFF control on a generator separately excited loop 100. One end of the generator switching unit 10 is connected to an excitation positive terminal D+ of a generator via a first diode D1 for preventing a generator excitation coil from generating a reverse voltage, and the other end of the generator switching unit 10 is connected to a positive electrode of the storage battery B1 via an ignition switch K1, thereby forming a controllable circuit connecting in series from the positive electrode of the storage battery B1 to the excitation positive terminal D+ of the generator, where a negative electrode of the first diode D1 is connected to the excitation positive terminal D+ of the generator. The positive electrode of the storage battery B1 is connected to a positive output terminal B+ of the generator G, a negative electrode of the storage battery B1 is connected to a ground GND, and an indicator L1 is also provided on a branch where the positive electrode of the storage battery B1 is connected to the excitation positive terminal D+ of the generator G.

The generator switching unit 10 is provided with a generator control relay K2, a coil of the generator control relay K2 is connected in parallel with the engine ECU, and a contact of the generator control relay K2 is connected in series to the controllable circuit from the positive electrode of the storage battery B1 to the excitation positive terminal D+ of the generator, where one end of the contact of the generator control relay K2 is connected to the ignition switch K1 and the other end of the contact the generator control relay K2 is connected to the first diode D1.

In the present embodiment, the contact of the generator control relay K2 is a normally closed contact. The first diode D1 can effectively avoid the influence of the reverse voltage generated by the generator excitation coil on the entire circuit.

In the present embodiment, after receiving the engine speed signal and the engine starting signal, the engine ECU controls the coil of the generator control relay K2 to be energized to make the contact of the generator control relay K2 disconnected, such that the generator separately excited loop 100 is disconnected to make the generator G unable to generate electricity. When receiving an engine speed signal indicating that the engine enters an idling condition, the engine ECU controls the coil of the generator control relay K2 to be de-energized to make the contact of the generator control relay K2 closed, such that the generator separately excited loop 100 is closed, the storage battery B1 provides a separate excitation current for the generator G, and the generator G generates electricity. Then, when the engine normally operates, the generator G is able to generate electricity, while the generator G is able to carry out self-excitation electricity generation after normal electricity generation.

Embodiment 3

Figure 3:
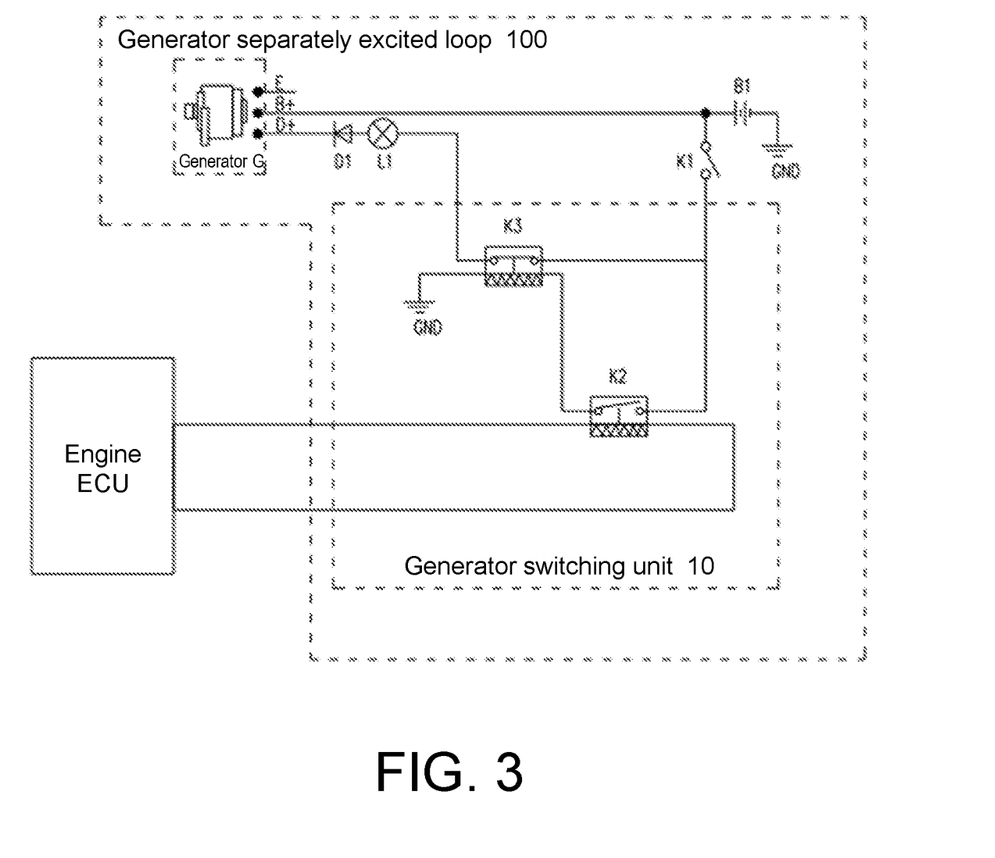
FIG. 3 is a schematic view of a circuit structure according to Embodiment 3 of the present invention.

As shown in FIG. 3, the present invention provides a vehicle generator control system, including an engine ECU and a storage battery B1, and further including a generator switching unit 10 connected using signals to the engine ECU and adapted to carry out ON/OFF control on a generator separately excited loop 100. One end of the generator switching unit 10 is connected to an excitation positive terminal D+ of a generator via a first diode D1 for preventing a generator excitation coil from generating a reverse voltage, and the other end of the generator switching unit 10 is connected to a positive electrode of the storage battery B1 via an ignition switch K1, thereby forming a controllable circuit connecting in series from the positive electrode of the storage battery B1 to the excitation positive terminal D+ of the generator, where a negative electrode of the first diode D1 is connected to the excitation positive terminal D+ of the generator. The positive electrode of the storage battery B1 is connected to a positive output terminal B+ of the generator G, a negative electrode of the storage battery B1 is connected to a ground GND, and an indicator L1 is also provided on a branch where the positive electrode of the storage battery B1 is connected to the excitation positive terminal D+ of the generator G.

The generator switching unit 10 is provided with a generator relay K2 and a first control relay K3 for the generator control relay K2 connected in series to the controllable circuit from the positive electrode of the storage battery B1 to the excitation positive terminal D+ of the generator G, and a coil of the first control relay K3 is connected in series to a contact of the generator control relay K2, where an end of the generator control relay K2 opposite to the contact of the generator control relay K2 connecting to the ignition switch K1 is connected to the coil of the first control relay K3, and an end of the first control relay K3 opposite to a connecting end of the coil of the first control relay K3 connecting to the contact of the generator control relay K2 is connected to a ground GND. A contact of the first control relay K3 is connected in series to the controllable circuit from the positive electrode of the storage battery B1 to the excitation positive terminal D+ of the generator G, where one end of the contact of the first control relay K3 is connected to the ignition switch K1 and the other end of the contact of the first control relay K3 is connected to the first diode D1, the contact of the generator control relay K2 is a normally open contact, and the contact of the first control relay K3 is a normally closed contact.

In the present embodiment, after receiving the engine speed signal and the engine starting signal, the engine ECU controls the contact of the generator control relay K2 to be closed to make the contact of the first control relay K3 disconnected, such that the generator separately excited loop 100 is disconnected to make the generator G unable to generate electricity. When receiving an engine speed signal indicating that the engine enters an idling condition, the engine ECU controls the contact of the generator control relay K2 to be disconnected to make the contact of the first control relay K3 closed, such that the generator separately excited loop 100 is closed, the storage battery B1 provides a separate excitation current for the generator G, and the generator G generates electricity. Then, when the engine normally operates, the generator G is able to generate electricity, while the generator G is able to carry out self-excitation electricity generation after normal electricity generation.

Embodiment 4

Figure 4:
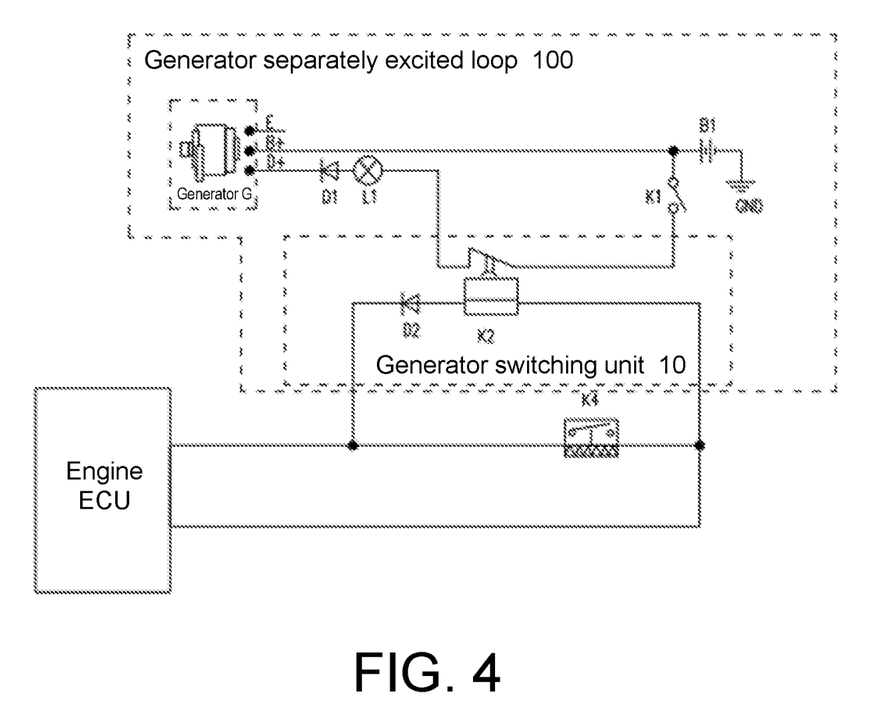
FIG. 4 is a schematic view of a circuit structure according to Embodiment 4 of the present invention.

As shown in FIG. 4, a difference from Embodiment 2 is that the coil of the generator control relay K2 is connected in parallel with the engine ECU after being connected in series to a second diode D2 for preventing instantaneous generation of a reverse voltage due to disconnection of the coil of the generator control relay K2, and the engine ECU is further connected in parallel with a coil of a starter control relay K4. The contact of the generator control relay K2 is a time-delay closed normally closed contact.

In the present embodiment, the second diode D2 is provided to prevent instantaneous generation of the reverse voltage due to disconnection of the coil of the generator control relay K2, thereby avoiding interference on the line diagnosis and control of the starter control relay K4 caused by the influence of the reverse voltage on the engine ECU. The engine ECU controls the generator control relay K2 and the starter control relay K4, and the generator control relay K2 carries out time delay closing, which can effectively improve control precision and accuracy. The contact of the starter control relay K4 is a normally open contact.

In the present embodiment, during operation, after receiving the engine speed signal and the engine starting signal, the engine ECU controls the starter control relay K4 to be closed and also controls the coil of the generator control relay K2 to be energized to make the contact of the generator control relay K2 disconnected, such that the generator separately excited loop 100 is disconnected to make the generator G unable to generate electricity. When receiving an engine speed signal indicating that the engine enters an idling condition, the engine ECU controls the starter control relay K4 to be disconnected and also controls the contact of the generator control relay K2 to be closed and energized after time delay, such that the generator separately excited loop 100 is closed, the storage battery B1 provides a separate excitation current for the generator G, and the generator G generates electricity. Then, when the engine normally operates, the generator G is able to generate electricity, while the generator G is able to carry out self-excitation electricity generation after normal electricity generation.

Embodiment 5

Figure 5:
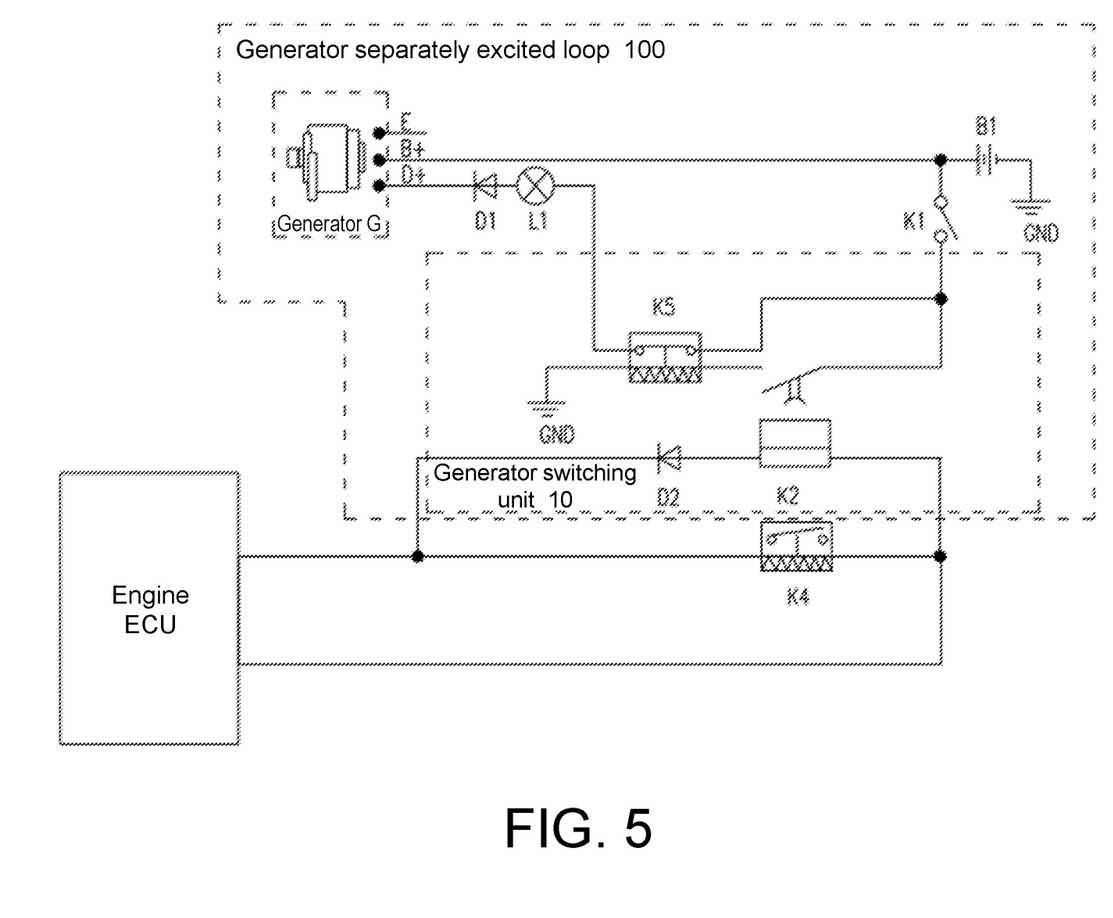
FIG. 5 is a schematic view of a circuit structure according to Embodiment 5 of the present invention.

As shown in FIG. 5, a difference from Embodiment 4 is that the generator switching unit 10 is provided with a generator control relay K2 and a second control relay K5 for the generator control relay K2 connected in series to the controllable circuit from the positive electrode of the storage battery B1 to the excitation positive terminal D+ of the generator G, and a coil of the second control relay K5 is connected in series to a contact of the generator control relay K2, where an end of the generator control relay K2 opposite to a connecting end of the contact of the generator control relay K2 connecting to the ignition switch K1 is connected to the coil of the second control relay K5, and an end of the second control relay K5 opposite to a connecting end of the coil of the second control relay K5 connecting to the contact of the generator control relay K2 is connected to a ground GND. A contact of the second control relay K5 is connected in series to the controllable circuit from the positive electrode of the storage battery B1 to the excitation positive terminal D+ of the generator G, where one end of the contact of the second control relay K5 is connected to the ignition switch K1 and the other end of the contact of the second control relay K5 is connected to the first diode D1, the contact of the generator control relay K2 is a time-delay disconnected normally open contact, and the contact of the second control relay K5 is a normally closed contact.

In the present embodiment, during operation, after receiving the engine speed signal and the engine starting signal, the engine ECU controls the starter control relay K4 to be closed and also controls the contact of the generator control relay K2 to be closed to make the second control relay K5 disconnected, such that the generator separately excited loop 100 is disconnected to make the generator G unable to generate electricity. When receiving an engine speed signal indicating that the engine enters an idling condition, the engine ECU controls the starter control relay K4 to be disconnected and also controls the contact of the generator control relay K2 to be disconnected after time delay to make the second control relay K5 closed, such that the generator separately excited loop 100 is closed, the storage battery B1 provides a separate excitation current for the generator G, and the generator G generates electricity. Then, when the engine normally operates, the generator G is able to generate electricity, while the generator G is able to carry out self-excitation electricity generation after normal electricity generation.

The engine ECU simultaneously controls the generator control relay K2 and the starter control relay K4, and the generator control relay K2 carries out time delay disconnection to control the second control relay K5 to be closed, which can effectively improve the control precision and accuracy.

The above is only a preferred implementation of the present invention, and it should be noted that those skilled in the art can make various modifications and improvements without departing from the structure of the present invention, and such modifications and improvements do not affect the implementation effects and applicability of the present invention.

What is claimed is:

1. A vehicle generator control method, an engine ECU controlling a generator according to an operating condition of an engine, wherein a control process being as follows:
    when the engine ECU determines that the engine is in a starting condition, the engine ECU controls a generator separately excited loop to be disconnected, so that the generator does not generate electricity; and
    when the engine ECU determines that the engine enters an idling condition, the engine ECU controls the generator separately excited loop to be closed so that the generator is started to generate electricity, and after the generator is started to generate electricity, the generator carries out normal electricity generation until the engine stops operating,
    wherein the engine ECU determines the operating condition of the engine via an engine speed signal and an engine starting signal, when the engine ECU receives the engine starting signal and the received engine speed signal displays that an engine speed is lower than an idling speed, the engine is in the starting condition, and when the engine speed signal received by the engine ECU displays that the engine speed is equal to the idling speed, the engine is in the idling condition.

2. The vehicle generator control method according to claim 1, wherein the generator separately excited loop is provided with a generator control relay, and the engine ECU carries out ON/OFF control on the generator separately excited loop via the generator control relay to control an operation of the generator.

3. The vehicle generator control method according to claim 2, wherein the generator control relay is arranged on a controllable circuit connecting in series from an excitation positive terminal of the generator to a positive electrode of a storage battery.

4. The vehicle generator control system according to claim 3, comprising an engine ECU and a storage battery, wherein further comprising a generator switching unit connected using signals to the engine ECU and adapted to carry out ON/OFF control on a generator separately excited loop, wherein one end of the generator switching unit is connected to an excitation positive terminal of the generator via a first diode for preventing a generator excitation coil from generating a reverse voltage, and the other end of the generator switching unit is connected to a positive electrode of the storage battery via an ignition switch, thereby forming a controllable circuit connecting in series from the positive electrode of the storage battery to the excitation positive terminal of the generator, wherein a negative electrode of the first diode is connected to the excitation positive terminal of the generator.

5. The vehicle generator control system according to claim 4, wherein the generator switching unit is provided with a generator control relay, a coil of the generator control relay is connected in parallel with the engine ECU, and a contact of the generator control relay is connected in series to the controllable circuit from the positive electrode of the storage battery to the excitation positive terminal of the generator, one end of the contact of the generator control relay being connected to the ignition switch and the other end of the contact of the generator control relay being connected to the first diode.

6. The vehicle generator control system according to claim 5, wherein the generator switching unit is further provided with a first control relay, the generator control relay is connected via the first control relay in series to the controllable circuit from the positive electrode of the storage battery to the excitation positive terminal of the generator, a coil of the first control relay is connected in series to the contact of the generator control relay, wherein an end of the generator control relay opposite to a connecting end of the contact of the generator control relay connecting to the ignition switch is connected to the coil of the first control relay, an end of the first control relay opposite to a connecting end of the coil of the first control relay connecting to the contact of the generator control relay is connected to a ground, a contact of the first control relay is connected in series to the controllable circuit from the positive electrode of the storage battery to the excitation positive terminal of the generator, wherein one end of the contact of the first control relay is connected to the ignition switch and the other end of the contact of the first control relay is connected to the first diode, the contact of the generator control relay is a normally open contact, and the contact of the first control relay is a normally closed contact.

7. The vehicle generator control system according to claim 2, comprising an engine ECU and a storage battery, wherein further comprising a generator switching unit connected using signals to the engine ECU and adapted to carry out ON/OFF control on a generator separately excited loop, wherein one end of the generator switching unit is connected to an excitation positive terminal of a generator via a first diode for preventing a generator excitation coil from generating a reverse voltage, and the other end of the generator switching unit is connected to a positive electrode of the storage battery via an ignition switch, thereby forming a controllable circuit connecting in series from the positive electrode of the storage battery to the excitation positive terminal of the generator, wherein a negative electrode of the first diode is connected to the excitation positive terminal of the generator.

8. The vehicle generator control system according to claim 7, wherein the generator switching unit is provided with a generator control relay, a coil of the generator control relay is connected in parallel with the engine ECU, and a contact of the generator control relay is connected in series to the controllable circuit from the positive electrode of the storage battery to the excitation positive terminal of the generator, one end of the contact of the generator control relay being connected to the ignition switch and the other end of the contact of the generator control relay being connected to the first diode.

9. The vehicle generator control system according to claim 8, wherein the generator switching unit is further provided with a first control relay, the generator control relay is connected via the first control relay in series to the controllable circuit from the positive electrode of the storage battery to the excitation positive terminal of the generator, a coil of the first control relay is connected in series to the contact of the generator control relay, wherein an end of the generator control relay opposite to a connecting end of the contact of the generator control relay connecting to the ignition switch is connected to the coil of the first control relay, an end of the first control relay opposite to a connecting end of the coil of the first control relay connecting to the contact of the generator control relay is connected to a ground, a contact of the first control relay is connected in series to the controllable circuit from the positive electrode of the storage battery to the excitation positive terminal of the generator, wherein one end of the contact of the first control relay is connected to the ignition switch and the other end of the contact of the first control relay is connected to the first diode, the contact of the generator control relay is a normally open contact, and the contact of the first control relay is a normally closed contact.

10. The vehicle generator control system according to claim 1, comprising the engine ECU and a storage battery, wherein further comprising the generator switching unit connected using signals to the engine ECU and adapted to carry out ON/OFF control on a generator separately excited loop, wherein one end of the generator switching unit is connected to an excitation positive terminal of the generator via a first diode for preventing a generator excitation coil from generating a reverse voltage, and the other end of the generator switching unit is connected to a positive electrode of the storage battery via an ignition switch, thereby forming a controllable circuit connecting in series from the positive electrode of the storage battery to the excitation positive terminal of the generator, wherein a negative electrode of the first diode is connected to the excitation positive terminal of the generator.

11. The vehicle generator control system according to claim 10, wherein the generator switching unit is provided with a generator control relay, a coil of the generator control relay is connected in parallel with the engine ECU, and a contact of the generator control relay is connected in series to the controllable circuit from the positive electrode of the storage battery to the excitation positive terminal of the generator, one end of the contact of the generator control relay being connected to the ignition switch and the other end of the contact of the generator control relay being connected to the first diode.

12. The vehicle generator control system according to claim 11, wherein the generator switching unit is further provided with a first control relay, the generator control relay is connected via the first control relay in series to the controllable circuit from the positive electrode of the storage battery to the excitation positive terminal of the generator, a coil of the first control relay is connected in series to the contact of the generator control relay, wherein an end of the generator control relay opposite to a connecting end of the contact of the generator control relay connecting to the ignition switch is connected to the coil of the first control relay, an end of the first control relay opposite to a connecting end of the coil of the first control relay connecting to the contact of the generator control relay is connected to a ground, a contact of the first control relay is connected in series to the controllable circuit from the positive electrode of the storage battery to the excitation positive terminal of the generator, wherein one end of the contact of the first control relay is connected to the ignition switch and the other end of the contact of the first control relay is connected to the first diode, the contact of the generator control relay is a normally open contact, and the contact of the first control relay is a normally closed contact.

13. The vehicle generator control system according to claim 11, wherein the coil of the generator control relay is connected in parallel with the engine ECU after being connected in series to a second diode for preventing instantaneous generation of a reverse voltage due to disconnection of the coil of the generator control relay, and the engine ECU is further connected in parallel with a coil of a starter control relay.

14. The vehicle generator control system according to claim 13, wherein the contact of the generator control relay is a time-delay closed normally closed contact.

15. The vehicle generator control system according to claim 13, wherein the generator switching unit is further provided with a second control relay, the generator control relay is connected via the second control relay in series to the controllable circuit from the positive electrode of the storage battery to the excitation positive terminal of the generator, a coil of the second control relay is connected in series to the contact of the generator control relay, wherein an end of the generator control relay opposite to a connecting end of the contact of the generator control relay connecting to the ignition switch is connected to the coil of the second control relay, an end of the second control relay opposite to a connecting end of the coil of the second control relay connecting to the contact of the generator control relay is connected to a ground, a contact of the second control relay is connected in series to the controllable circuit from the positive electrode of the storage battery to the excitation positive terminal of the generator, wherein one end of the contact of the second control relay is connected to the ignition switch and the other end of the contact of the second control relay is connected to the first diode, the contact of the generator control relay is a time-delay disconnected normally open contact, and the contact of the second control relay is a normally closed contact.

16. The vehicle generator control system according to claim 1, comprising an engine ECU and a storage battery, wherein further comprising a generator switching unit connected using signals to the engine ECU and adapted to carry out ON/OFF control on a generator separately excited loop, wherein one end of the generator switching unit is connected to an excitation positive terminal of a generator via a first diode for preventing a generator excitation coil from generating a reverse voltage, and the other end of the generator switching unit is connected to a positive electrode of the storage battery via an ignition switch, thereby forming a controllable circuit connecting in series from the positive electrode of the storage battery to the excitation positive terminal of the generator, wherein a negative electrode of the first diode is connected to the excitation positive terminal of the generator.

17. The vehicle generator control system according to claim 16, wherein the generator switching unit is provided with a generator control relay, a coil of the generator control relay is connected in parallel with the engine ECU, and a contact of the generator control relay is connected in series to the controllable circuit from the positive electrode of the storage battery to the excitation positive terminal of the generator, one end of the contact of the generator control relay being connected to the ignition switch and the other end of the contact of the generator control relay being connected to the first diode.

18. The vehicle generator control system according to claim 17, wherein the generator switching unit is further provided with a first control relay, the generator control relay is connected via the first control relay in series to the controllable circuit from the positive electrode of the storage battery to the excitation positive terminal of the generator, a coil of the first control relay is connected in series to the contact of the generator control relay, wherein an end of the generator control relay opposite to a connecting end of the contact of the generator control relay connecting to the ignition switch is connected to the coil of the first control relay, an end of the first control relay opposite to a connecting end of the coil of the first control relay connecting to the contact of the generator control relay is connected to a ground, a contact of the first control relay is connected in series to the controllable circuit from the positive electrode of the storage battery to the excitation positive terminal of the generator, wherein one end of the contact of the first control relay is connected to the ignition switch and the other end of the contact of the first control relay is connected to the first diode, the contact of the generator control relay is a normally open contact, and the contact of the first control relay is a normally closed contact.

19. The vehicle generator control system according to claim 17, wherein the coil of the generator control relay is connected in parallel with the engine ECU after being connected in series to a second diode for preventing instantaneous generation of a reverse voltage due to disconnection of the coil of the generator control relay, and the engine ECU is further connected in parallel with a coil of a starter control relay.

* * * * *